(12) United States Patent
Vittimberga et al.

(10) Patent No.: US 10,513,081 B1
(45) Date of Patent: Dec. 24, 2019

(54) METHOD OF MAKING A TRANSACTION INSTRUMENT

(71) Applicant: WELLS FARGO BANK, N.A., San Francisco, CA (US)

(72) Inventors: Paul Vittimberga, Oakland, CA (US); Kristine Ing, Orinda, CA (US); John Wright, Benicia, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 14/564,842

(22) Filed: Dec. 9, 2014

Related U.S. Application Data

(60) Provisional application No. 61/914,118, filed on Dec. 10, 2013.

(51) Int. Cl.

| | |
|---|---|
| *G06K 19/06* | (2006.01) |
| *G06K 19/00* | (2006.01) |
| *G06K 19/02* | (2006.01) |
| *B29C 67/00* | (2017.01) |
| *B22F 3/105* | (2006.01) |
| *B22F 3/02* | (2006.01) |
| *B22F 7/02* | (2006.01) |
| *B22F 5/00* | (2006.01) |
| *B28B 1/00* | (2006.01) |
| *B23K 15/00* | (2006.01) |
| *B23K 26/34* | (2014.01) |

(Continued)

(52) U.S. Cl.
CPC ............ *B29C 67/0077* (2013.01); *B22F 3/02* (2013.01); *B22F 3/1055* (2013.01); *B22F 5/00* (2013.01); *B22F 7/02* (2013.01); *B23K 15/0086* (2013.01); *B23K 26/34* (2013.01); *B28B 1/001* (2013.01); *G06K 19/041* (2013.01); *B33Y 10/00* (2014.12); *B33Y 80/00* (2014.12)

(58) Field of Classification Search
CPC ........ G06K 19/06; G06K 19/00; G06K 19/02; G06K 5/00; G06K 7/08
USPC ........ 235/492, 380, 488, 487, 451, 375, 792
See application file for complete search history.

(56) References Cited

U.S. PATENT DOCUMENTS

| | | | |
|---|---|---|---|
| 4,114,032 A | | 9/1978 | Brosow et al. |
| 4,906,494 A | * | 3/1990 | Babinec .................... B32B 7/02 |
| | | | 206/524.6 |

(Continued)

FOREIGN PATENT DOCUMENTS

| | | |
|---|---|---|
| JP | H06103423 A | 4/1994 |
| KR | 20100000467 A | 1/2010 |

(Continued)

OTHER PUBLICATIONS

Waters, M., Cast vs. Calendered Vinyl, signindustry.com, http://www.signindustry.com/vinyl/articles/2013-05-15-Avery-CastVsCalendered.php3, Jun. 9, 2015, pp. 1-3.

(Continued)

*Primary Examiner* — Edwyn Labaze
(74) *Attorney, Agent, or Firm* — Shumaker & Sieffert, P.A.

(57) ABSTRACT

A method of making a transaction instrument comprising making a transaction instrument by three-dimensional (3D) printing or additive manufacturing. The transaction instrument such as a transaction card may have many features or components made by or using three-dimensional (3D) printing or additive manufacturing.

27 Claims, 30 Drawing Sheets

(51) Int. Cl.
*G06K 19/04* (2006.01)
*B33Y 10/00* (2015.01)
*B33Y 80/00* (2015.01)

(56) References Cited

U.S. PATENT DOCUMENTS

| | | | |
|---|---|---|---|
| 5,106,288 A | 4/1992 | Hughes | |
| 5,120,589 A | 6/1992 | Morikawa et al. | |
| 5,134,773 A | 8/1992 | LeMaire et al. | |
| 5,236,637 A | 8/1993 | Hull | |
| 5,434,917 A | 7/1995 | Naccache et al. | |
| 5,602,381 A | 2/1997 | Hoshino et al. | |
| 5,714,747 A | 2/1998 | West et al. | |
| 6,104,311 A * | 8/2000 | Lastinger | G06K 7/086 340/10.51 |
| 6,176,430 B1 | 1/2001 | Finkelstein et al. | |
| 6,221,296 B1 | 4/2001 | James et al. | |
| 6,364,982 B1 | 4/2002 | Lynch | |
| 6,471,128 B1 | 10/2002 | Corcoran et al. | |
| 6,894,624 B2 | 5/2005 | Kim et al. | |
| 6,930,606 B2 | 8/2005 | Crane et al. | |
| 7,240,847 B2 | 7/2007 | Püschner et al. | |
| 7,241,537 B2 * | 7/2007 | Kaule | G03F 7/001 430/1 |
| 7,494,057 B2 | 2/2009 | Lasch et al. | |
| 7,733,231 B2 | 6/2010 | Carney et al. | |
| 7,785,680 B2 | 8/2010 | Brennan et al. | |
| 7,892,474 B2 | 2/2011 | Shkolnik et al. | |
| 8,121,386 B2 | 2/2012 | Rancien | |
| 8,302,870 B2 | 11/2012 | Paeschke et al. | |
| 8,322,623 B1 | 12/2012 | Mullen et al. | |
| 8,383,329 B2 | 2/2013 | Matsuda et al. | |
| 8,523,062 B2 | 9/2013 | Varga et al. | |
| 9,016,591 B2 | 4/2015 | Herslow et al. | |
| 9,390,363 B1 * | 7/2016 | Herslow | B29C 59/026 |
| 2003/0131932 A1 | 7/2003 | Hoult et al. | |
| 2004/0161592 A1 | 8/2004 | Yoshida et al. | |
| 2005/0035491 A1 | 2/2005 | Bagnall et al. | |
| 2005/0196604 A1 | 9/2005 | Funicelli et al. | |
| 2005/0277231 A1 | 12/2005 | Hembree et al. | |
| 2006/0074813 A1 | 4/2006 | Saunders | |
| 2006/0147742 A1 | 7/2006 | Matsuda et al. | |
| 2008/0063462 A1 | 3/2008 | Steinschaden | |
| 2009/0074231 A1 * | 3/2009 | Rancien | D21H 21/40 382/100 |
| 2009/0184168 A1 | 7/2009 | Ricketts et al. | |
| 2010/0078489 A1 | 4/2010 | Winkler | |
| 2010/0096465 A1 | 4/2010 | Stagg | |
| 2010/0194093 A1 | 8/2010 | Macpherson | |
| 2011/0064388 A1 * | 3/2011 | Brown et al. | 386/285 |
| 2012/0055013 A1 * | 3/2012 | Finn | 29/600 |
| 2012/0125993 A1 * | 5/2012 | Thiele | B42D 25/405 235/375 |
| 2012/0153812 A1 * | 6/2012 | Aurongzeb | H01L 27/3204 313/504 |
| 2013/0292862 A1 | 11/2013 | Joyce | |
| 2013/0295212 A1 | 11/2013 | Chen et al. | |
| 2013/0300101 A1 * | 11/2013 | Wicker | G07D 7/0093 283/67 |
| 2013/0332353 A1 | 12/2013 | Aidasani et al. | |
| 2013/0334808 A1 | 12/2013 | Hazen et al. | |
| 2013/0335416 A1 * | 12/2013 | Coon et al. | 345/423 |
| 2014/0014715 A1 | 1/2014 | Moran et al. | |
| 2014/0076965 A1 * | 3/2014 | Becorest et al. | 235/380 |
| 2014/0117094 A1 | 5/2014 | Workley et al. | |
| 2014/0129354 A1 * | 5/2014 | Soon-Shiong | 705/16 |
| 2014/0224881 A1 | 8/2014 | Herslow | |
| 2014/0273961 A1 | 9/2014 | Narendra et al. | |
| 2014/0344091 A1 | 11/2014 | Krebs | |
| 2014/0367894 A1 * | 12/2014 | Kramer et al. | 264/482 |
| 2014/0367957 A1 * | 12/2014 | Jordan | G02B 3/0043 283/85 |
| 2014/0379557 A1 | 12/2014 | Brown | |
| 2015/0041546 A1 | 2/2015 | Herslow et al. | |
| 2015/0042755 A1 * | 2/2015 | Wang | 348/46 |
| 2015/0045934 A1 | 2/2015 | Kallenbach et al. | |
| 2015/0087427 A1 * | 3/2015 | Wane | 463/43 |
| 2015/0088290 A1 * | 3/2015 | Ghosh | 700/98 |
| 2015/0095213 A1 | 4/2015 | Paintin | |
| 2015/0097315 A1 | 4/2015 | DeSimone et al. | |
| 2016/0307088 A1 | 10/2016 | Wurmfeld et al. | |
| 2016/0363613 A1 | 12/2016 | Albertson et al. | |

FOREIGN PATENT DOCUMENTS

| | | |
|---|---|---|
| KR | 20160066300 A | 6/2016 |
| KR | 101653702 B1 | 9/2016 |
| WO | 2009/084774 A1 | 7/2009 |

OTHER PUBLICATIONS

Wikipedia, 3D printing, http://en.wikipedia.org/wiki/3D_printing, Oct. 29, 2013, pp. 1-8.

Leaverusch, Robert D., Article, Now They Want Plastics to Be Heavy?, Plastics Technology, 5 pages, (Jun. 2001).

Article, Metal 3D Printing, http://gpiprototype.com/services/metal-3d-printing.html, Jun. 9, 2015, pp. 1-3.

Smart Card Technology, The Smart Card Report (Eighth Edition), pp. 269-287 (2004), only first page available online; full article available for purchase at http://www.sciencedirect.com/science/article/pii/B9781856174176500121.

Launey, Maximilien E., Munch, Etienne, Alsem, Daan Hein, Saiz, Eduardo, Tomsia, Antoni P., and Ritchie, Robert O.; A novel biomimetic approach to the design of high-performance ceramic-metal composites; Journal of the Royal Society Interface; Oct. 14, 2009; pp. 741-753; published online; all enclosed pages cited.

Bourzac, Katherine; Ceramics That Won't Shatter; MIT Technology Review; Dec. 4, 2008; http://www.technologyreview.com/news/411301/ceramics-that-wont-shatter/page/2/; accessed on Nov. 20, 2014; all enclosed pages cited.

Technical Overview of Biopolymer Field; https://www.princeton.edu/~ota/disk1/1993/9313/931304.PDF; accessed Aug. 18, 2016; all enclosed pages cited.

Huisman, J., Stevel, A.L.N, Stobbe, I.; Eco-efficiency considerations on the end-of-life of consumer electronic products; IEEE Transactions on Electronics Packaging Manufacturing, v 27, n. 1, p. 9-25; Jan. 2004; all enclosed pages cited.

Prosecution History from U.S. Appl. No. 14/933,472, dated Jun. 29, 2016 through Feb. 5, 2019, 74 pp.

Notice of Allowance from U.S. Appl. No. 14/933,472, dated Mar. 1, 2019, 9 pages.

Office Action from U.S. Appl. No. 16/444,930, dated Jul. 25, 2019, 7 pp.

Response to Office Action dated Jul. 25, 2019, from U.S. Appl. No. 16/444,930, filed Oct. 25, 2019, 2 pp.

* cited by examiner

METHOD OF MAKING A TRANSACTION INSTRUMENT

CROSS-REFERENCE TO RELATED APPLICATIONS

This application claims priority from U.S. patent application Ser. No. 61/914,118, filed on Dec. 10, 2013, in the United States Patent and Trademark Office. The disclosure of which is incorporated herein by reference in its entirety.

FIELD OF THE INVENTION

The present invention relates to a method of making a transaction instrument such as for use in a financial transaction.

BACKGROUND OF THE INVENTION

Payment cards are used every day for financial transactions throughout the world. The most common examples of payment cards are credit cards and debit cards. The most common method by which such cards are currently mass manufactured is by extruding and/or calendaring one or more layers of plastic, applying printing, and laminating said layers, often along with additional foils or protective coatings. However, there are disadvantages associated with such processes. Mass manufacturing creates the card and then subsequently the card must be personalized through embossing, printing, laser etching or some other means. A recess may have to be formed through milling or another removal process in order to allow for the insertion of the devices such as a package containing an integrated circuit and contacts. Mass manufacturing also does not support customization of shape, color, or other features of the card body on a card by card basis. Mass manufacturing is not well suited to producing metal cards, since they are expensive and difficult to personalize. Mass manufacturing does not support production in remote locations such as a branch location or a customer site. Also, mass manufacturing is done in larger batches and creates inventory and carrying costs. Thus, there is a need for an alternative method of making a payment card or transaction instrument that addresses the disadvantages.

SUMMARY OF THE INVENTION

The present invention relates to a transaction instrument and a method of making a transaction instrument by additive manufacturing, also referred to as three-dimensional (3D) printing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTION OF THE INVENTION

Figure 1:
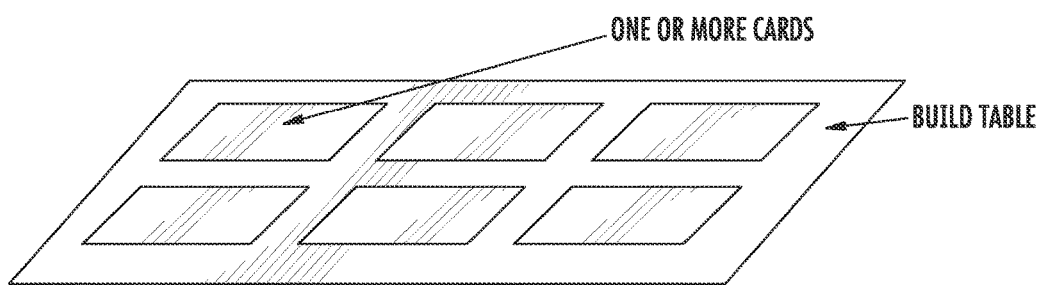
FIG. 1 illustrates a transaction instrument three-dimensionally printed into a form of a transaction card.

The following detailed description of the embodiment(s) is merely exemplary in nature and is in no way intended to limit the invention, its application, or uses.

The present invention relates to a transaction instrument made by a process of additive manufacturing or three-dimensional printing. The transaction instrument is enabled to perform a financial transaction and is suitable for use in a financial transaction such as making a purchase or conducting another type of monetary transaction in commerce. Transaction instruments may be in the form of cards such as a credit card, debit card, automatic-teller machine (ATM) card, check card, stored-value cards, and gift cards, among others. Transaction instruments may be associated with various types of financial accounts such as a credit card account, debit card account, automatic-teller machine (ATM) account, direct deposit account, check, closed loop gift card account, open loop gift card account, or a combination thereof. Transaction instruments may take other various forms including, but not limited to, various electronic devices. Examples of such other electronic devices include, but are not limited to, fob, ring, watch, wrist band, bracelet, other electronic jewelry, hand-held devices, among others.

In an aspect of the invention, the transaction instrument is a card having at least two sides or surfaces. The transaction card may have a graphics layer on one or both sides having an indicium indicative of an account associated with the transaction card. The indicium can be provided by at least one personalization process. The personalization process may comprise at least one of dye sublimation printing, screen printing, gravure printing, lithography, inkjet printing, laser printing, indentation, additive manufacturing, or a combination thereof. As a feature of the invention, the indicium is provided free from milling or laser etching. The indicium can also be provided by 3-dimensional printing. The indicium can be of a different color than the side of the card. The indicium can be raised with respect to the side of the card. The indicium may comprise Braille lettering.

In another aspect of the invention, the card is enabled to perform a financial transaction by inclusion of a machine readable indicium. The machine readable indicium may comprise a magnetic strip. As a feature of the invention, the transaction card comprises a recess to accommodate the machine readable indicium. The recess may begin approximately 3.8 mm (0.15 inches) to 16.5 mm (0.65 inches) from the longer edge of the card and have a width ranging from approximately 2.54 mm (0.10 inches) to 10.1 mm (0.40 inches). The recess can be made by leaving a void during the three-dimensional printing or additive manufacturing process. The recess can be made using subtractive manufacturing after additive manufacturing or 3-dimensional printing. In another feature of the invention, additive manufacturing or three-dimensional printing inclusive of the recess is done onto or around the machine readable indicium.

The transaction card has a surface finish in a range of 0.15 micrometers (6 microinches) to 0.40 micrometers (15.9 microinches).

In another aspect of the invention, the transaction card is compliant with at least a portion of ISO 7810, ISO 7811, ISO 7816, or a combination thereof.

The method of making the transaction instrument of the present invention comprises additive manufacturing, also referred to as three-dimensional (3D) printing. Additive manufacturing or 3D printing generally refers to making a three-dimensional object or shape from a digital computer model. A transaction instrument made in accordance with the present invention is comprised of layers corresponding to virtual cross-sections from a computer model. Thus, 3D printing is an additive process in which successive layers of material are laid down to form the object or shape.

Among the types of additive manufacturing or 3D printing processes that may be suitable for use in the method of the present invention include, but are not limited to, selective laser melting, direct metal laser sintering, selective laser sintering, fused deposition modeling, selective fusing of materials in a granular bed, stereolithography, laminated object manufacturing, electron-beam freeform fabrication, electron-beam melting, selective heat sintering, plaster-based 3D printing, digital light processing, and other selective fusing or photopolymerization processes.

Fused deposition modeling is a type of extrusion deposition. Selective fusing of materials in a granular bed is an example of granular materials binding and is an example of an additive manufacturing process. Laminated object manufacturing is another type of additive manufacturing involving lamination. Stereolithography and digital-light processing are types of photopolymerization.

As indicated above, the transaction instrument made by additive manufacturing or 3D printing may be made in various shapes and sizes. The transaction instrument may also be finished. The transaction instrument may be finished, for example, by subtractive manufacturing.

Figure 2:
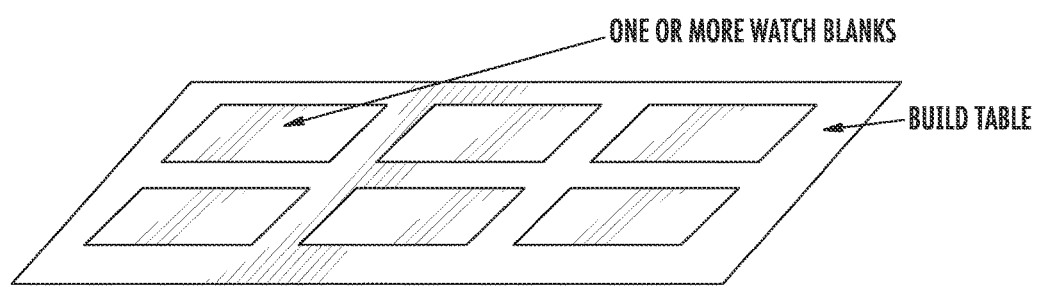
FIG. 2 illustrates a transaction instrument three-dimensionally printed into a form of a watch blank.
Figure 3:
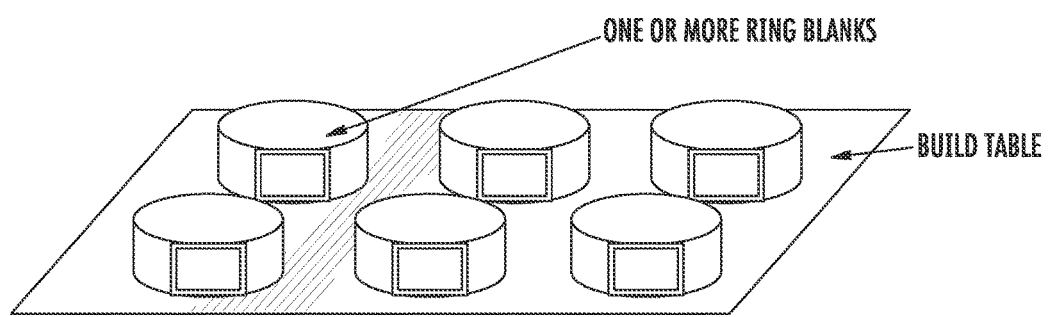
FIG. 3 illustrates a transaction instrument three-dimensionally printed into a form of a ring.

A transaction instrument may be 3D printed into a transaction card such as a credit card or debit card as illustrated in FIG. 1. As shown in FIG. 1, a platform or table comprising one or more transaction cards can be built by 3D printing. A transaction instrument may be 3D printed into an electronic device in another form. As shown in FIG. 2, a table comprising one or more watch blanks can be built by 3D printing. A transaction instrument may be 3D printed into an electronic device in another form such as a bracelet or a ring as shown in FIG. 3. As shown in FIG. 3, a table comprising one or more ring blanks can be built by 3D printing. The transaction instrument may be 3D printed into an electronic device into a form including, but not limited to, a key ring or key fob, ring, watch, wrist band, bracelet, card, and other shaped devices.

The materials used in the transaction instrument of the present invention and in the 3D printing process include, but are not limited to, plastic, metal, ceramic, carbon, and a combination thereof. The term "metal", as used herein, includes, but is not limited to, metallic elements, metal-containing compounds, other metal forms, or a combination thereof. The plastic may further comprise a plasticizer. The plastic may be optically transparent. The optically transparent plastic may be opaque to some or all light outside of the visible spectrum. The optically transparent plastic may be opaque to ultraviolet light.

In a preferred aspect of the invention, a combination of materials used is a plastic and metal blend such as a metal-filled plastic.

Examples of polymers that may be suitable for making the plastics include, but are not limited to, polyvinyl chloride (PVC), polyvinyl chloride acetate (PVCA), oriented polyester, polyethylene, polyethylene terephthalate including biaxially-oriented polyethylene terephthalate, polyethylene glycol (PET-G), acrylonitrile butadiene styrene (ABS), polycarbonate, polypropylene, and a combination thereof.

In accordance with aspects of the present invention, the method of making a transaction instrument comprises making a three-dimensional object of any shape from a digital computer model. The method comprises laying down successive layers of material in different shapes. A materials printer is typically the type of machine used to perform 3D printing using digital technology.

The method of making a transaction instrument in accordance with the present invention may comprise modeling, printing, and finishing.

As to modeling, the method comprises slicing virtual blueprints taken from computer aided design (CAD) or animation modeling software into digital cross-sections for a machine to successively use as a guideline for printing. Depending on the machine used, the method may further comprise depositing material or a binding material on the build bed or platform until material/binder layering is complete and the final 3D model has been printed. The computer software may comprise a feature for customization of a shape for the transaction instrument, customization of personalization for the transaction instrument, or a combination thereof.

A standard data interface between CAD software and the machines is the stereolithography (STL) file format. An STL file approximates the shape of a part or assembly using triangular facets. Smaller facets produce a higher quality surface. Polygon file format (PLY) is a scanner generated input file format, and virtual reality modeling language (VRML or WRL) files are often used as input for 3D printing technologies that are able to print in full color.

As to printing, to perform a print, the machine reads the design from an .stl file and lays down successive layers of material to build the model from a series of cross sections. These layers, which correspond to the virtual cross sections from the CAD model, are joined or automatically fused to create the final shape. Printer resolution describes layer thickness and X-Y resolution in dpi (dots per inch) or micrometers. Typical layer thickness is around 100 micrometers (μm), although some machines can print layers as thin as 16 μm. X-Y resolution is comparable to that of laser printers. The particles (3D dots) are around 50 to 100 μm in diameter.

As to finishing, the method may further comprise printing a slightly oversized version of the object in standard resolution and then removing material with a higher-resolution subtractive process.

The method may further comprise 3D printing to pre-form a recess(es) around one or more components or inset devices of the transaction instrument. Examples of one or more components include, but are not limited to, a chip such as a Europay-Mastercard-Visa (EMV) chip, a contactless antenna, a contactless antenna chip, a magnetic strip, an in-laid decoration, embedded features, and printed features. The recess has a size and a shape to accommodate the component or inset device.

Figure 4:
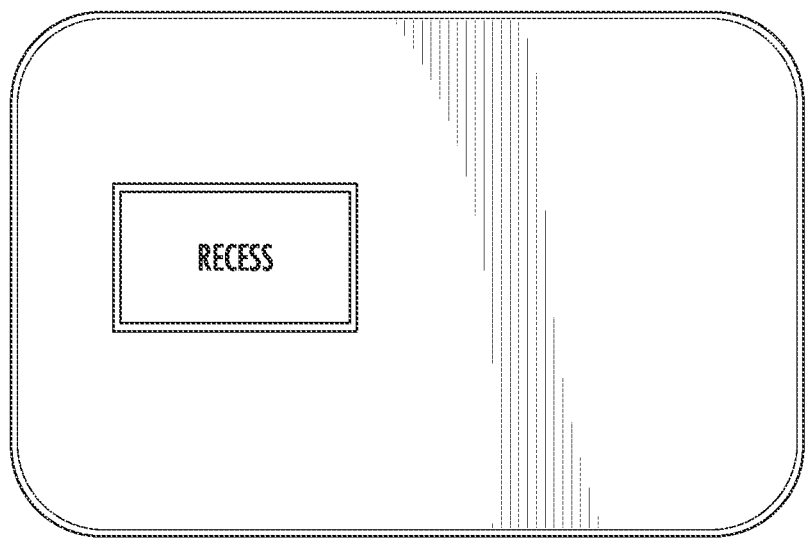
FIG. 4 illustrates the top view as printed of a transaction instrument in a form of a transaction card that has a recess on the top face to allow the insertion of a device into the top surface.

In an aspect of the present invention, the inset device comprises at least one integrated circuit, also referred to as a chip. FIG. 4 illustrates the top view as printed of a transaction instrument in a form of a transaction card that has a recess on the top face to allow the insertion of a device into the top surface. The front of the card shows a recess such as for insertion of a chip. A recess is generally defined as an indentation, a cavity or an opening. The recess is left as a void when card is printed. The recess may be filled with supportive, non-binding material or may simply be an empty space.

Figure 5:
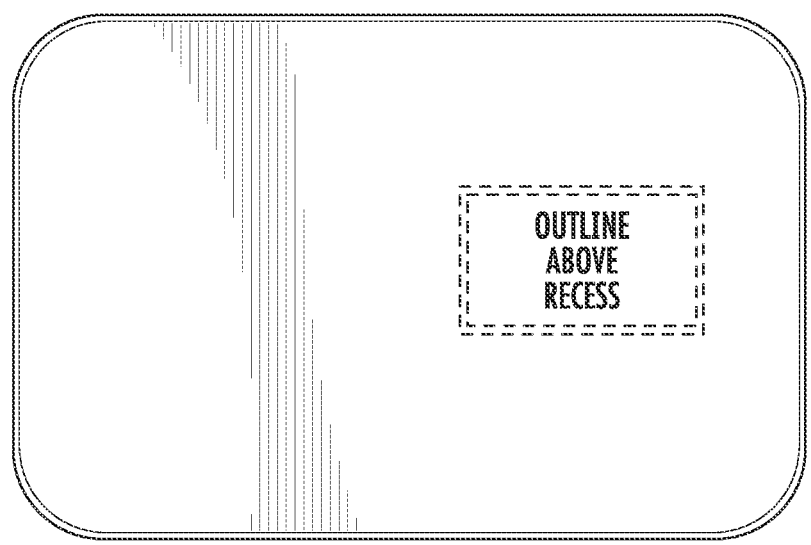
FIG. 5 illustrates a top view as printed of a transaction instrument in the form of a card that has a recess on the bottom surface below imaginary dashed lines to allow the insertion of a device into the bottom surface.

FIG. 5 illustrates a top view as printed of a transaction instrument in the form of a card that has a recess on the bottom surface below the imaginary dashed lines to allow the insertion of a device into the bottom surface. The recess is on the downward facing front of the card. In this configuration, the recess may be filled with supportive, non-binding material or with a pre-made blank that is either a part of the build platform or is placed on top of the build platform.

Figure 6:
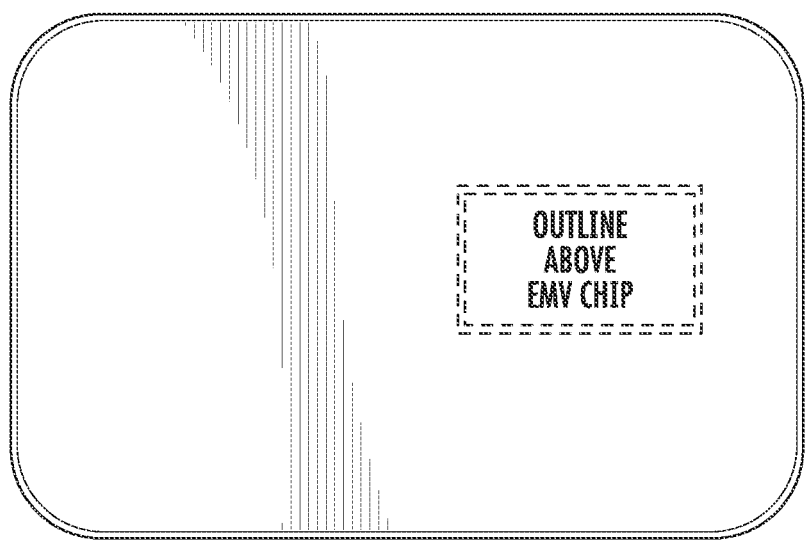
FIG. 6 illustrates a top view as printed of a transaction instrument in the form of a card that has been printed directly onto a device below the imaginary dashed lines.

FIG. 6 illustrates a top view as printed of a transaction instrument in the form of a card that has been printed directly onto a device below the imaginary dashed lines. In accordance with aspects of the method of the present invention, the method comprises first laying down a chip package with contacts facing down and building the card on top.

In an aspect of the invention, transaction card may have a recess for a contactless antenna/wires and a contactless antenna chip. This feature is particularly desirable for a split layer card where the recess is on an inner layer and the recessed portion would have the wires and chip added and then laminated to the other layers.

Figure 7:
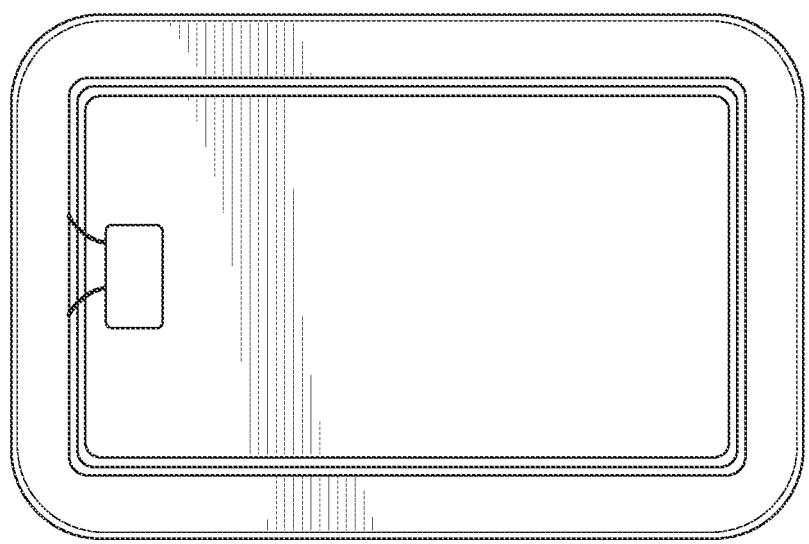
FIG. 7 illustrates a top view of a card or portion thereof as printed with a recess to allow for the insertion of contactless antenna and chip.

FIG. 7 illustrates the top view of a card or portion thereof as printed with a recess to allow for the insertion of contactless antenna and chip. The recess is on the downward facing front of the card. In this case, the recess is filled with supportive, non-binding material or with a pre-made blank that is either a part of the build platform or is placed on top of the build platform.

Figure 8:
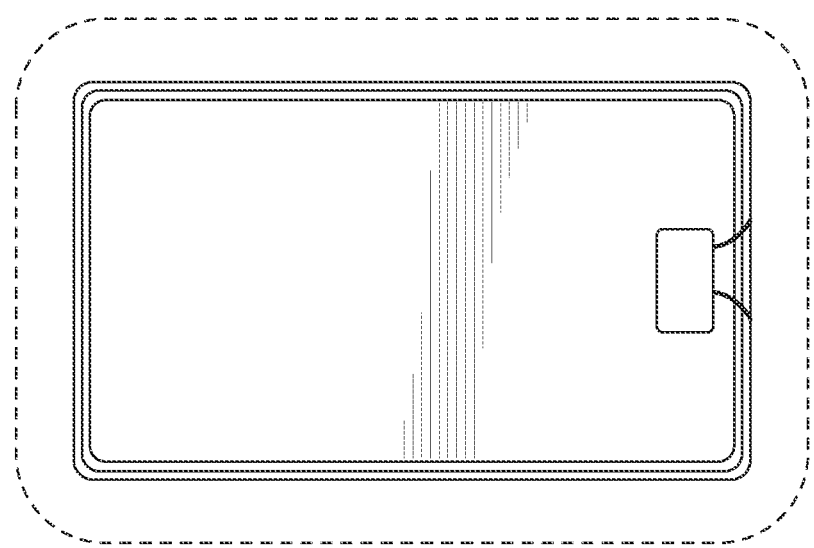
FIG. 8 illustrates a top view of a card as printed showing a contactless antenna and associated chip package directly under the imaginary dashed lines which was laid down onto a build platform before printing began and then printed over.

FIG. 8 illustrates a top view of a card as printed showing a contactless antenna and associated chip package directly under the imaginary dashed lines which was laid down onto a build platform before printing began and then printed over. The contactless antenna and chip are laid down first with contacts facing down and then card is built on top.

Figure 9:
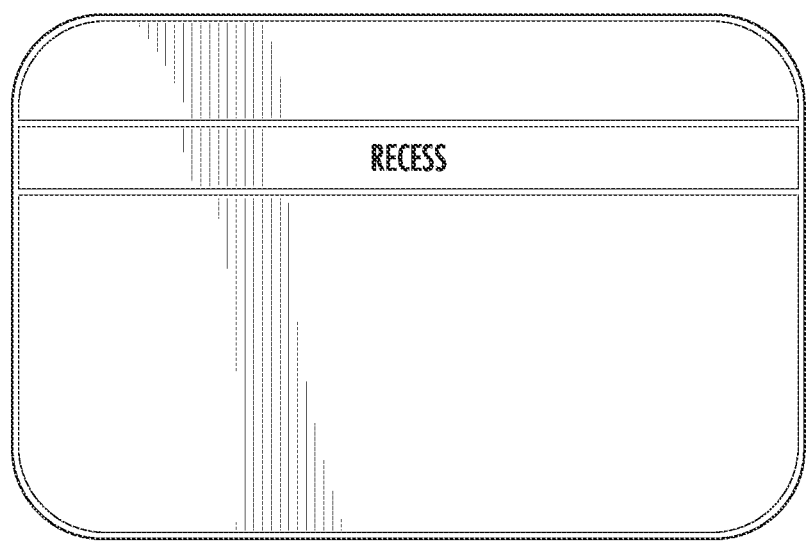
FIG. 9 illustrates a top view of a card as printed with a recess such as for insertion of a magnetic strip.

FIG. 9 illustrates another possible feature of a transaction card. FIG. 9 illustrates a top view of a card as printed with a recess such as for insertion of a magnetic strip. A magnetic strip is another possible feature of a transaction card made in accordance with the present invention. The recess is not printed when the card is printed. Depending on the choice of 3D printing technology, the recess may be filled with supportive, non-binding material or may simply be empty space.

Figure 10:
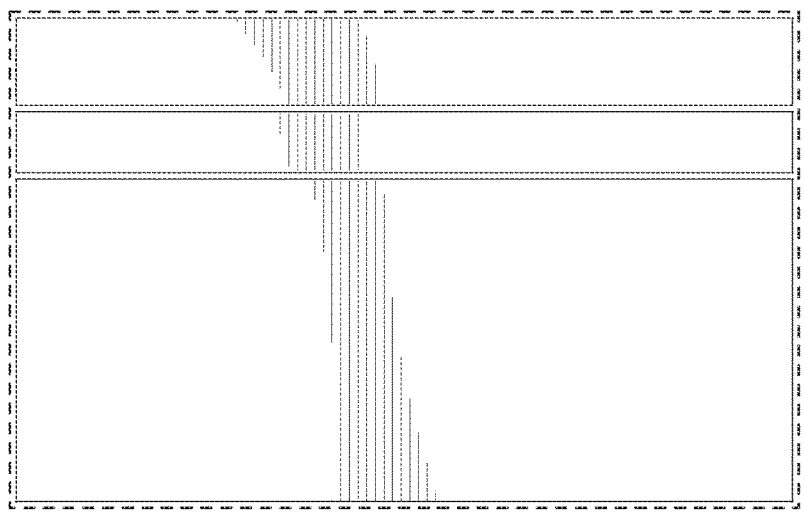
FIG. 10 illustrates a top view of a card as printed showing an outline above the recess on the bottom for insertion of a magnetic strip.
Figure 11:
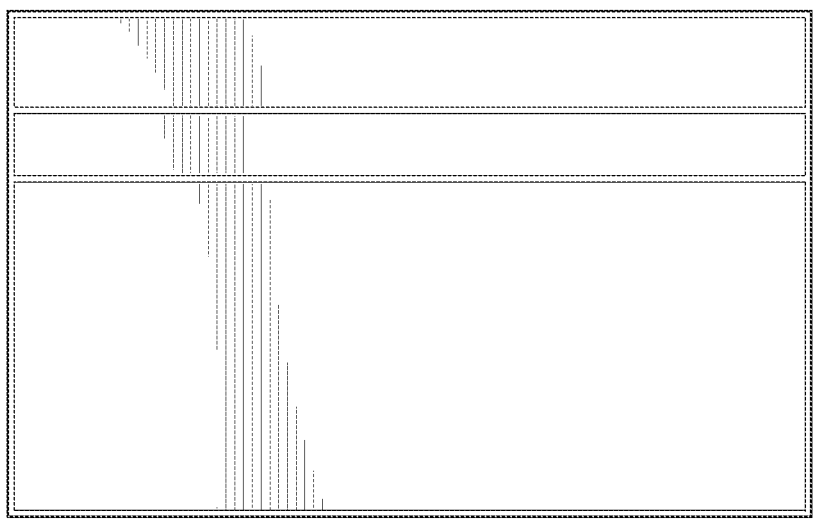
FIG. 11 illustrates a top view as printed of a transaction instrument in the form of a card that has been printed directly onto a magnetic strip below the imaginary dashed lines.

FIG. 10 illustrates a top view of the card as printed showing an outline above the recess on the bottom for insertion of a magnetic strip. The recess is on the downward facing front of the card. In this case, the recess can be filled with supportive, non-binding material or with a pre-made blank that is either a part of the build platform or is placed on top of the build platform. FIG. 11 illustrates a top view as printed of a transaction instrument in the form of a card that has been printed directly onto a magnetic strip below the imaginary dashed lines. For example, a magnetic strip is laid down first and then a card is built on it.

In accordance with aspects of 3D printing the transaction instrument of the present invention, there may be decorative features to a transaction card. One such example is an inlaid decoration as illustrated in FIGS. 12A and 12B.

Figure 12A:
FIG. 12A illustrates a card showing recesses for inlaid decoration.
Figure 12B:
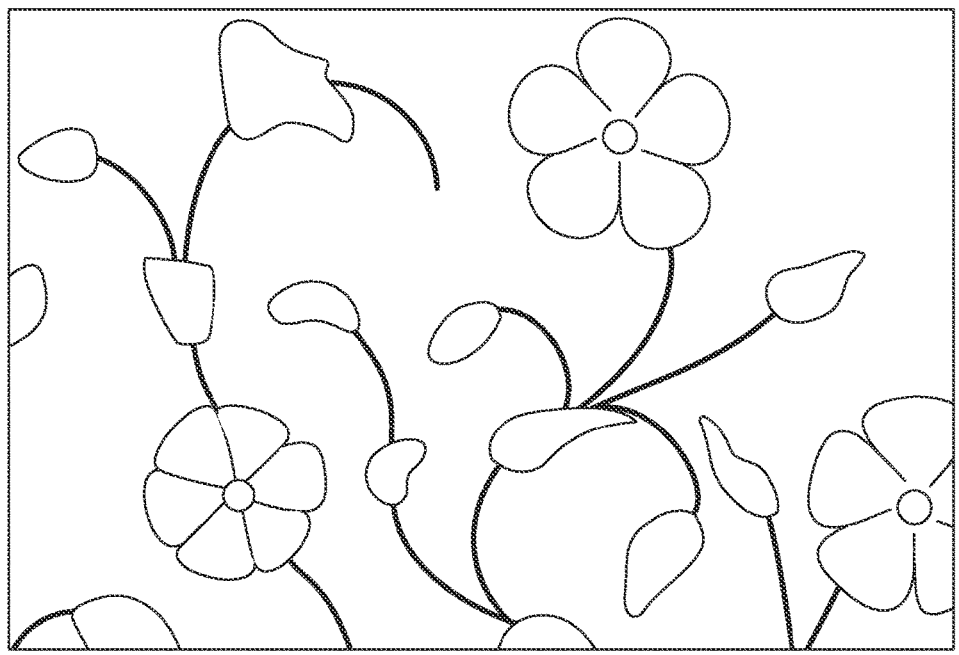
FIG. 12B illustrates a card with inlaid decoration added.

FIG. 12A illustrates a card showing recesses for inlaid decoration, and FIG. 12B illustrates a card with inlaid decoration added. In accordance with the 3D printing method of the present invention, a recess or recesses are not printed when card is printed. Depending on the type of 3D printing technology, the recess may be filled with supportive, non-binding material or may simply be empty space. The recess may be filled with supportive, non-binding material or with a pre-made blank that is either a part of the build platform or is placed on top of the build platform. Inlaid decoration(s) are laid down first and then card is built on top of it.

In accordance with aspects of making a transaction instrument of the present invention, the transaction instrument may be 3D printed with embedded, printed features. The transaction instrument may be made of one or more types of materials. For example, a metal antenna may be made through 3D printing and a plastic card body may be made through 3D printing.

Figure 13:
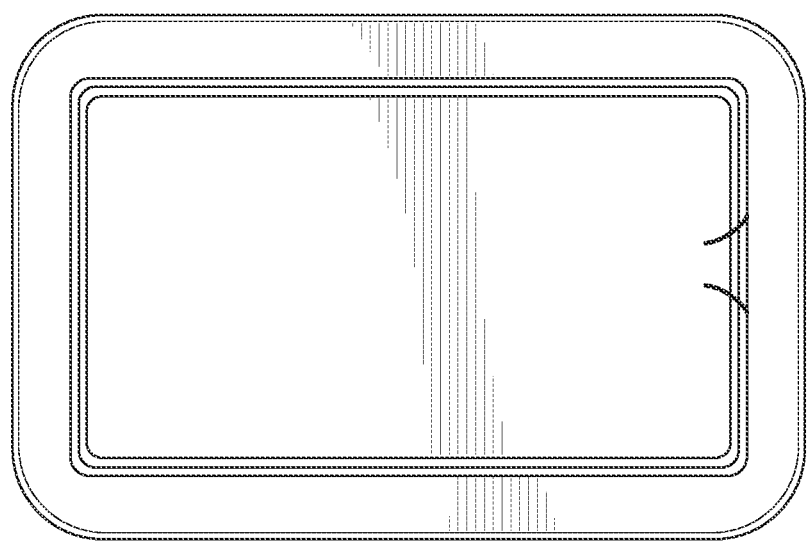
FIG. 13 illustrates a transaction card having a contactless antenna in which the antenna was printed as part of the 3D printing process.

A transaction instrument may be 3D printed to have various features including, but not limited to, the following features. FIG. 13 illustrates a transaction card having a contactless antenna in which the antenna was printed as part of the 3D printing process. A plastic card body may be made through 3D printing with a metal antenna (shown in black) also made through 3D printing. An alternative is the plastic body can be made by another method of manufacture, inserted onto the build platform, and then the antenna can be made through 3D printing or additive manufacturing. Completion of the plastic card can then be done by 3D printing or traditional lamination of layers.

Figure 14:
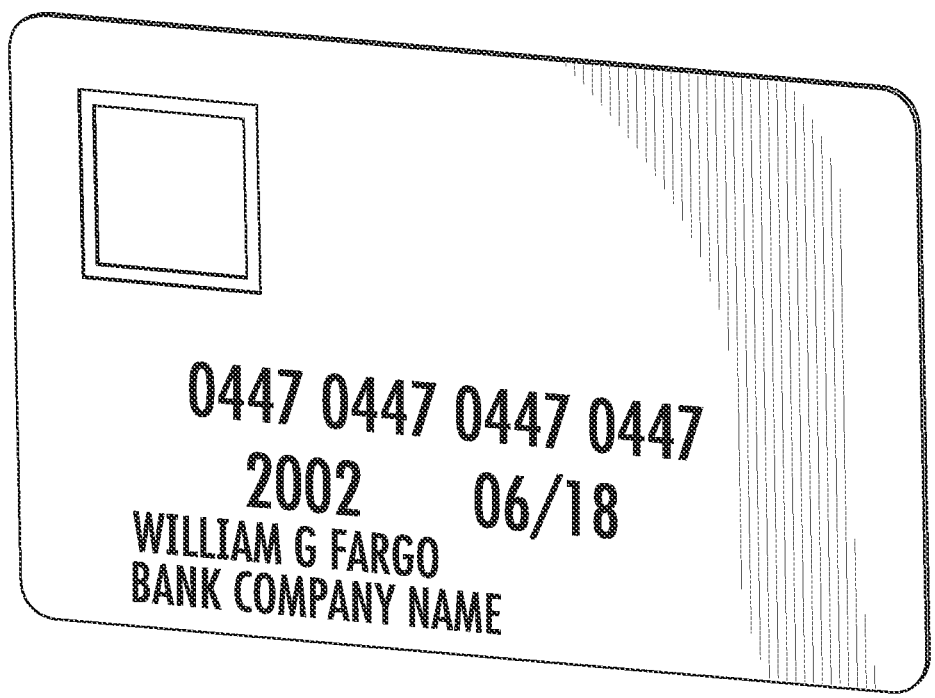
FIG. 14 illustrates a recess for an inset device such as an EMV chip.

FIG. 14 illustrates a recess for an inset device such as an EMV chip.

Figure 15:
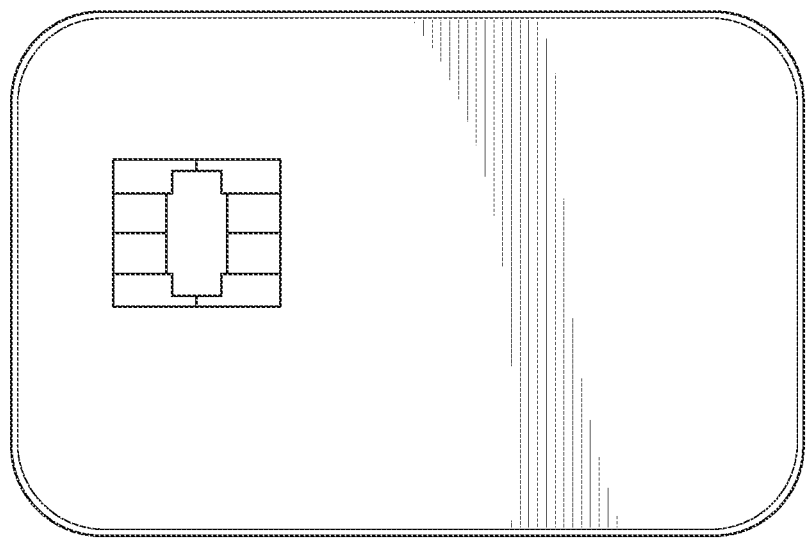
FIG. 15 illustrates a transaction card having contact pads such as EMV contact pads.

In another aspect of the present invention, the inset device comprises one or more conducting contact pads. FIG. 15 illustrates a transaction card having conducting contact pads such as EMV contact pads. The contact pads can be made in any shape as long as the required contact points are included. In another feature of the present invention, the contact pad(s) are located as set forth in ISO 7816 and/or have dimensions including a minimum size as set forth in ISO 7816.

Figure 16:
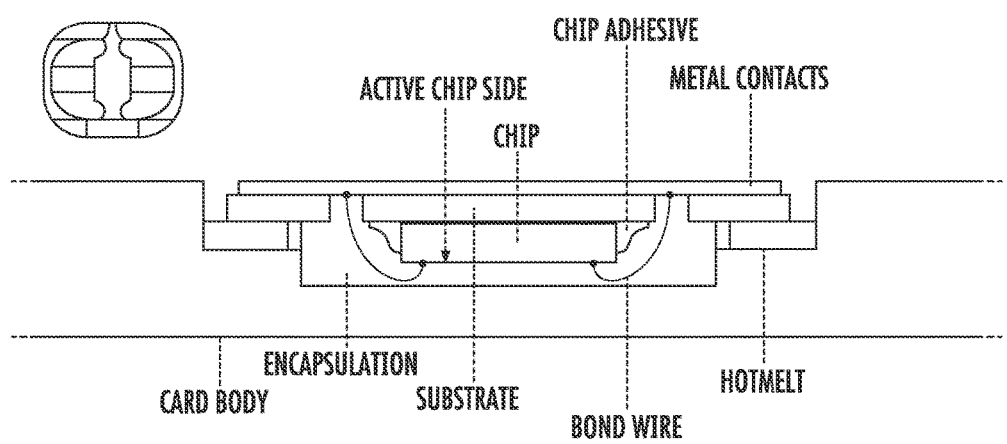
FIG. 16 illustrates a typical package for a contact smart card.

The plastic card body may be made through 3D printing or traditional methods of making a plastic card body. For example, a chip such as an EMV chip and/or a lead package is placed in a card body or a card body is built around the chip and the lead package. A contact pad for an EMV chip is printed in metal through 3D printing or an additive printing process. The shape of the printed contacts can be decorative and take any shape as long as the five required contact pads are covered. FIG. 16 illustrates a typical package for a contact smart card and card body, noting that a smart card has conductive contact pads (metal contacts). The conductive pads are attached to a chip by small bond wires. The conductive pad, chip, and bond wires are pre-manufactured into a package. This package has a depth of up to 20 mils and is deeper in the center than on the edges. The package is inserted and secured with an adhesive that is typically a hot melt glue into a recess with a deep center of approximately 20 mils and a shallower perimeter of 5 mils to 7 mils. The active chip side in relation to the substrate and encapsulation is illustrated in FIG. 16.

Figure 17:
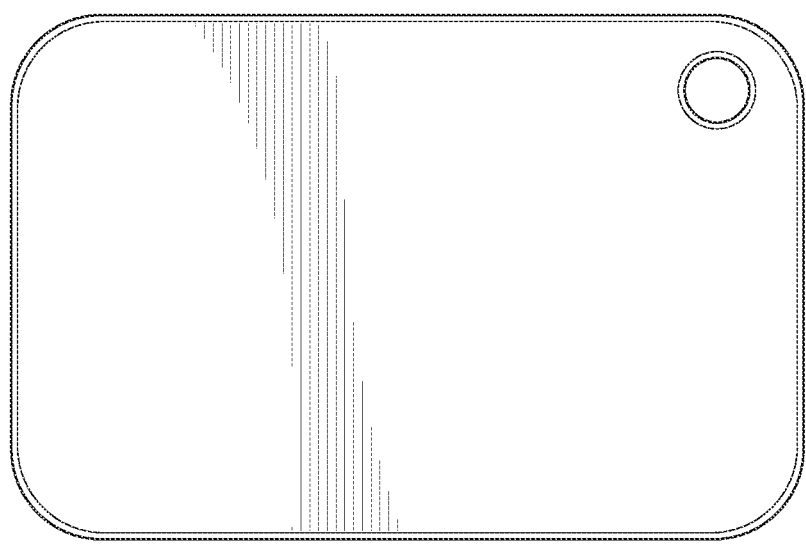
FIG. 17 illustrates a transaction card having a hole made for a key chain or other attachment.
Figure 18A:
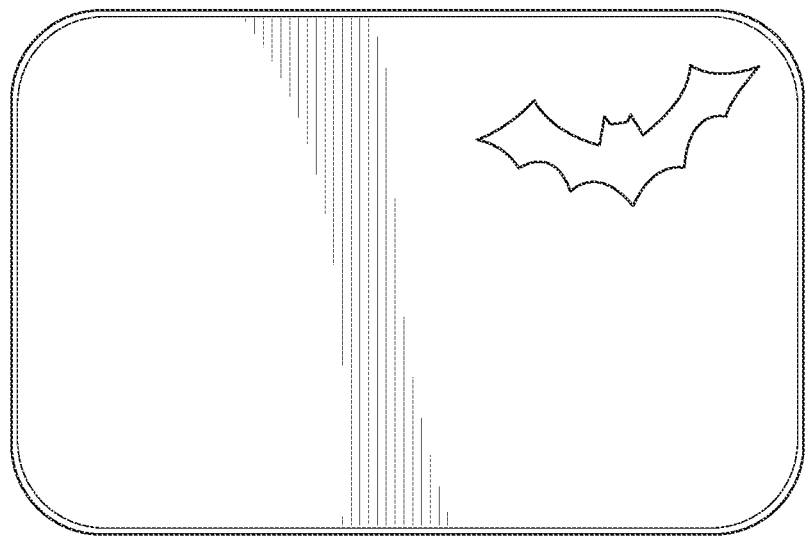
FIG. 18A and FIG. 18B illustrate that decorative holes in a transaction card of various patterns or shapes.
Figure 18B:
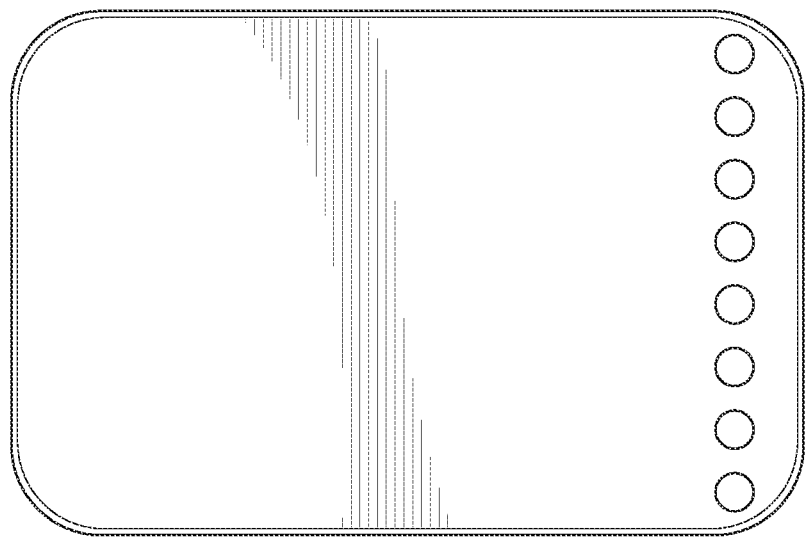

Another feature of a transaction card made in accordance with the method of the present invention is a hole is made for a keychain or other attachment as shown in FIG. 17. An attachment hole may be at any location on the card that does not have other required elements such as the magnetic stripe, chip, signature area, embossing area, among other elements. Decorative holes may be made in various patterns or shapes as shown in FIGS. 18A and 18B. A decorative hole or holes may be made at any location on the card that does not have other required elements such as the magnetic stripe, chip, signature area, embossing area, among other elements.

Figure 19:
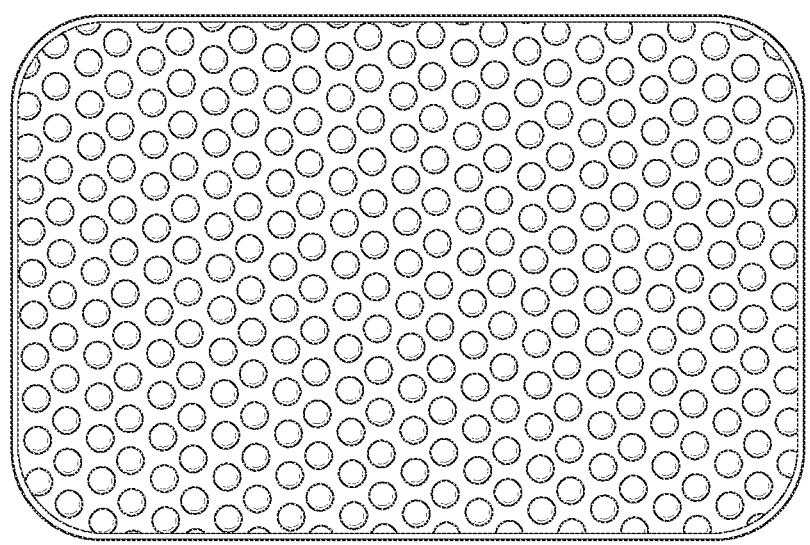
FIG. 19 illustrates a transaction card made by 3D printing having a textured finish.
Figure 20:
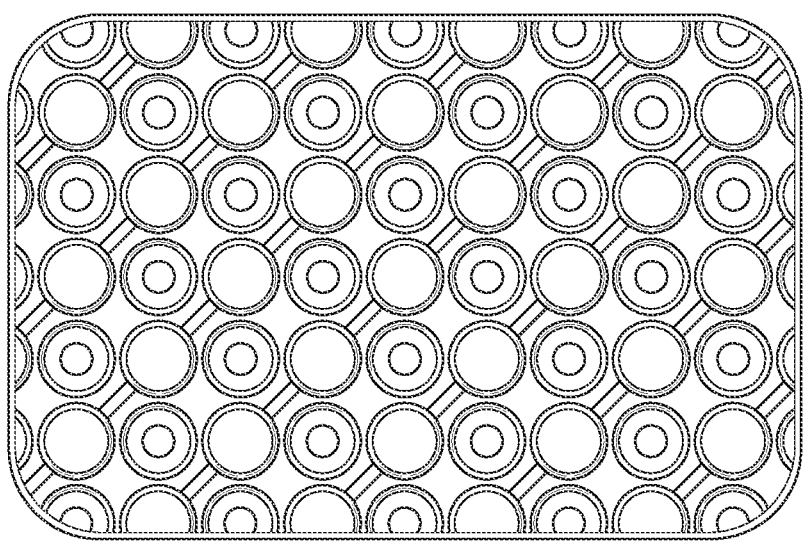
FIG. 20 illustrates a transaction card made by 3D printing having texture combined with holes.

A transaction card made by 3D printing in accordance with the present invention may have a textured finish as illustrated in FIG. 19. FIG. 19 illustrates a card having a dimpled texture; however, many textures are possible such as in a pattern (such as shown), randomly, or in a way that makes a picture. Texture can also be combined with holes as shown in FIG. 20.

Figure 21:
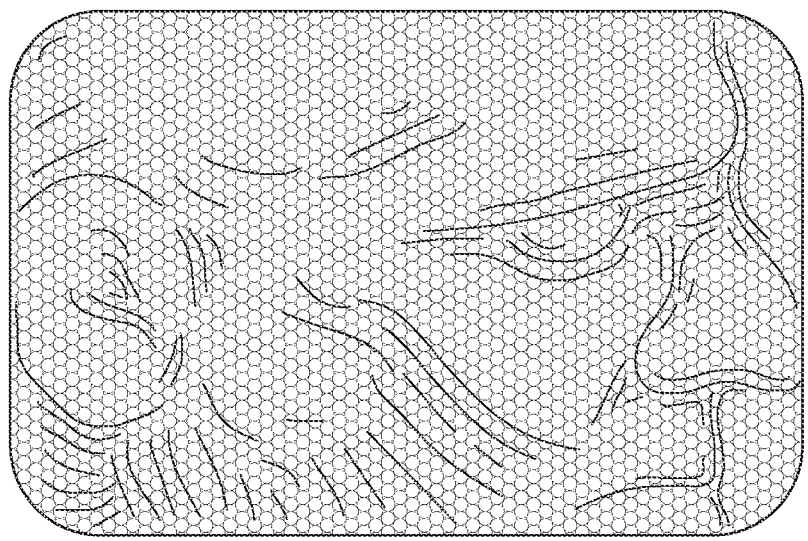
FIG. 21 illustrates a transaction card made by 3D printing having contours including three-dimensional images.

A transaction card made by 3D printing in accordance with the present invention may have contours, including 3D images as illustrated in FIG. 21. The face illustrated in FIG. 21 is an example of making a picture using contours. The use of contours can also be combined with different colors.

Figure 22:
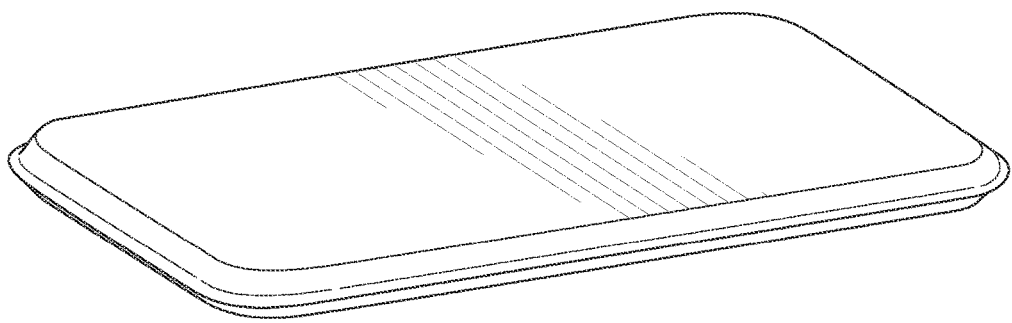
FIG. 22 illustrates a transaction card made by 3D printing having beveled or filleted card edges.

A transaction card made by 3D printing in accordance with the present invention may have beveled or filleted card edges as illustrated in FIG. 22. There are a variety of treatments that could be applied to the card edge.

Figure 23:
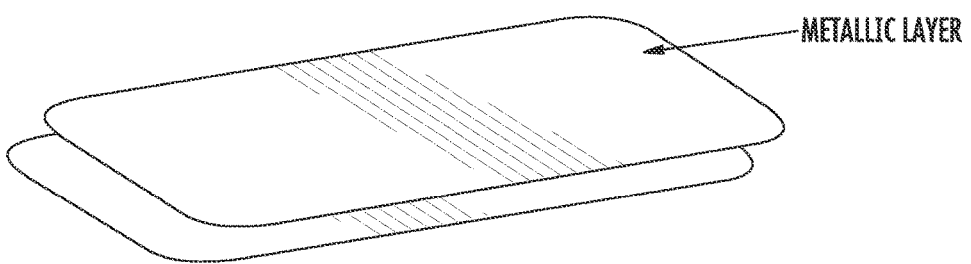
FIG. 23 illustrates a transaction card having a metal or non-metal foil layer(s).
Figure 24:
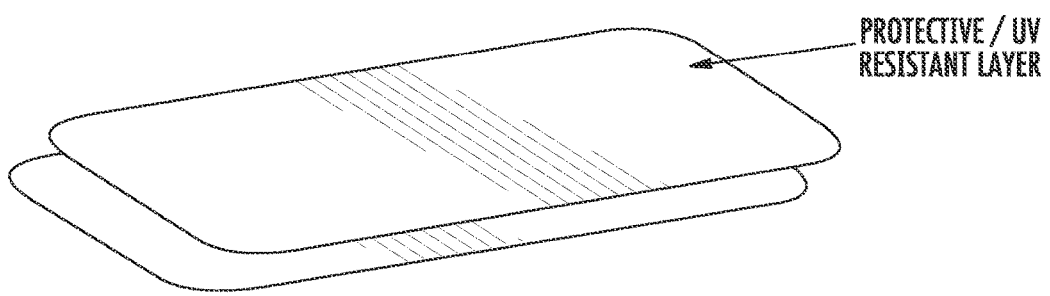
FIG. 24 illustrates a transaction card having an ultraviolet (UV) and/or scratch resistant layer(s).
Figure 25:
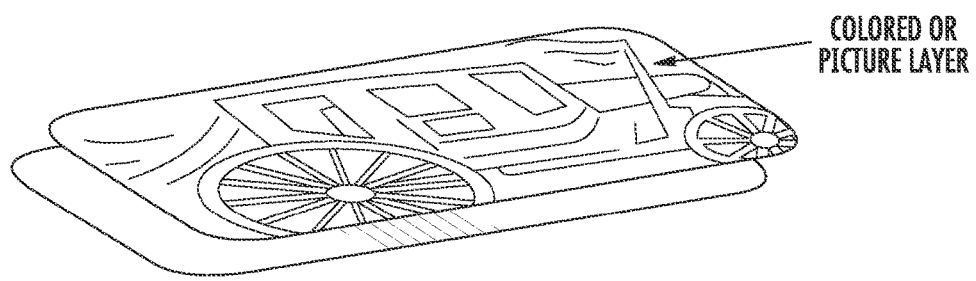
FIG. 25 illustrates a transaction card having a colored or picture layer(s) or areas.
Figure 26:
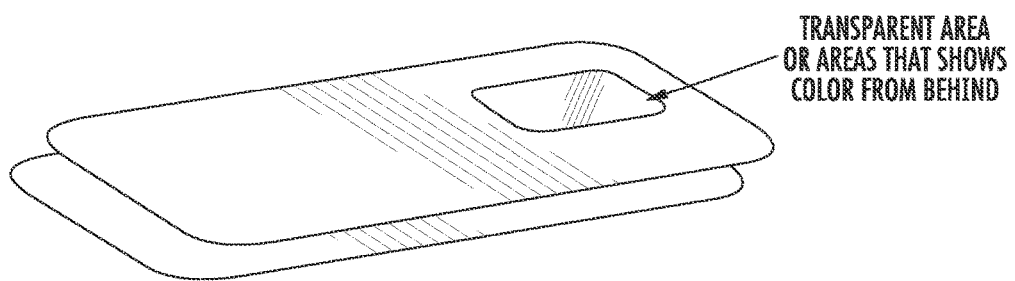
FIG. 26 illustrates a transaction card having a transparent layer(s) or areas.

A transaction card made by 3D printing in accordance with the present invention may comprise layers of different types of materials. For example, FIG. 23 illustrates a transaction card having a metal or non-metal foil layer(s). FIG. 24 illustrates a transaction card having an ultraviolet (UV) and/or scratch resistant layer(s). FIG. 25 illustrates a transaction card having a colored or picture layer(s) or areas. Colored areas may include logos or other images, for example. FIG. 26 illustrates a transaction card having a transparent layer(s) or areas. As shown in FIG. 26, the transparent area of area(s) show color from behind.

Figure 27:
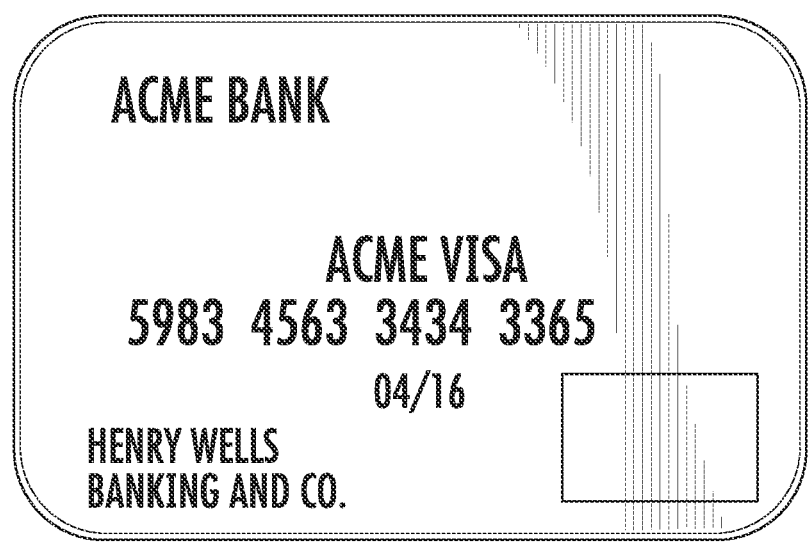
FIG. 27 illustrates a transaction card with personalization.
Figure 28:
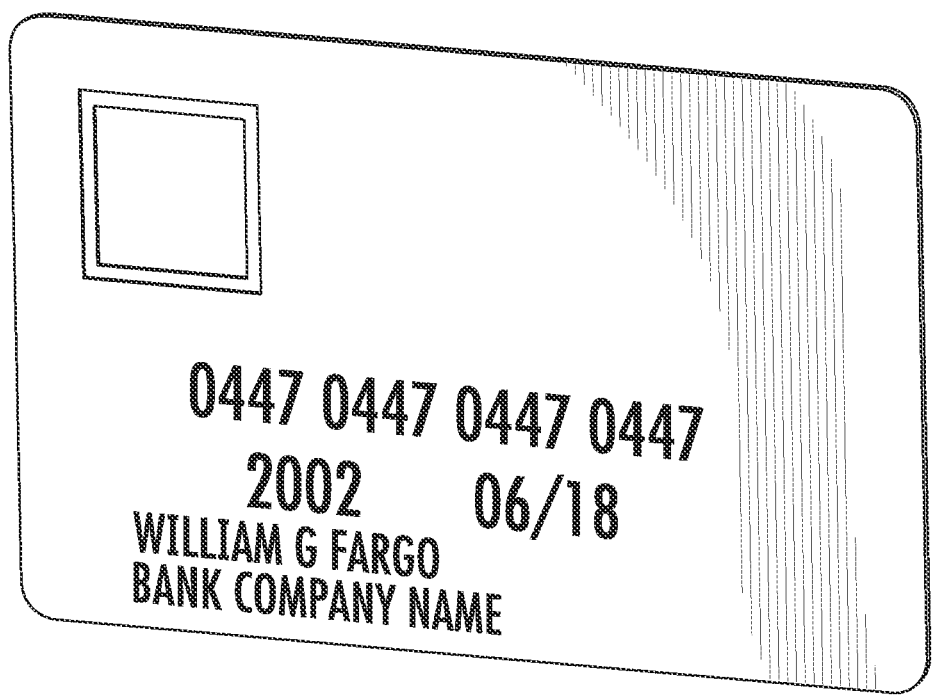
FIG. 28 illustrates that the lettering may be added by 3D personalization in accordance with the method of the present invention.

Another aspect of a transaction instrument, including a transaction card, made by 3D printing in accordance with the present invention is personalization. Part of personalization relates to fabrication. Fabrication is considered as part of making the body of the card through 3D printing or additive manufacturing. FIG. 27 illustrates a card with personalization. FIG. 28 illustrates that the lettering may be added by 3D personalization in accordance with the method of the present invention. Printed graphics may also be added.

As an additional 3D printing or additive manufacturing step, in either of the two examples below, the completed card would subsequently be personalized (lettering in black) typically at the time the card was needed for a particular customer. For a card made by 3D printing or additive manufacturing, the card or set of cards on a sheet made through additive manufacturing would be reloaded to an additive manufacturing machine for personalization.

For a card made by other methods such as traditional layers, a card or set of cards on a sheet made through traditional lamination would be loaded to an additive manufacturing machine for personalization.

The present invention encompasses various ways in which to differentiate personalization from background including, but are not limited to, recessed, raised and a different shade or color. With recessed, the personalization would be at a lower elevation than the surface of the card. With raised, the personalization would be at a higher elevation than the surface of the card. With a different color or shade, the personalization would be a color and/or shade designed to differentiate it from the surface of the card. Color differentiation could be combined with either recessed or raised lettering/numbering. Examples of personalized elements include, but are not limited to, name, account number, expiration date, card verification number, braille, and orientation.

For the visually impaired, braille could be used as an optional indication of the card's identity, bank name, and acceptance brand (Visa, MasterCard, Discover, American Express). The braille could be of a different height.

With regard to orientation, text could be parallel to the long axis of the card, "horizontal" or text could be parallel to the shorter axis of the card, "vertical" or text could be a combination of horizontal and vertical. The transaction card or instrument itself could be made to be horizontal or vertical in orientation.

A transaction instrument made by three-dimensional (3D) printing or additive manufacturing can be manufactured at a remote location such as a retail store, bank branch, office, or a residence that has compatible printing capability.

Remote manufacturing using the additive manufacturing method could be accomplished under the control of the bank or other issuing institution at a remote location. This allows direct interaction with the customer for input into the customization and more expedient pickup or delivery.

Remote manufacturing using the additive manufacturing method could also be accomplished under direct control of the end user either by providing 3D manufacturing equipment to the end user or by allowing the end user to download the required specification and files as well as acquire any non-printed components required to produce the transaction instrument. A machine readable indicium and other non-printed card components can be made available in a kit at the remote location for inclusion in a recess of the transaction card. The machine readable indicium can be printed directly onto the transaction card inclusive of the recesses for non-printed components during three-dimensional printing.

Remote manufacturing using the additive manufacturing method could also be accomplished by a distributor such as a retail store. In this instance, the store could produce one or a wide variety of transaction instrument types without the need to keep inventory of multiple transaction instrument types such as gift cards specific to a range of retailers.

Figure 29:
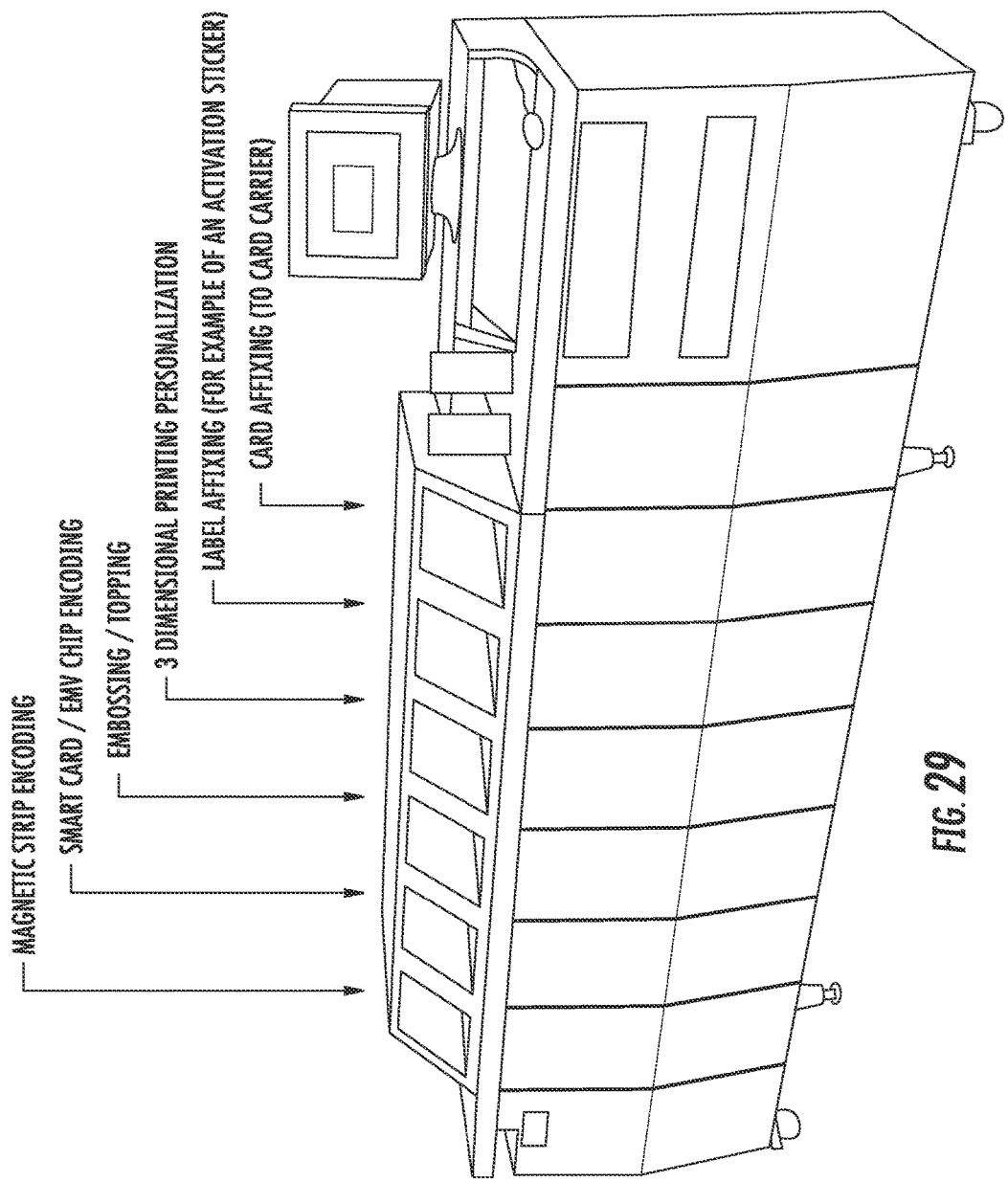
FIG. 29 illustrates a station of a personalization line identified as a 3D printer for personalization.

In another aspect of the present invention, a transaction card personalization line is provided. The transaction card personalization line comprises a three-dimensional printing station for personalization of transaction cards. FIG. 29 illustrates a station of a personalization line identified as a 3D printer for personalization. Examples of personalization include, but are not limited to, an indicium indicative of an account associated with the transaction card, a name of an individual or a company associated with the transaction card, Braille lettering, or a combination thereof. In another feature, the indicium is raised with respect to a surface of the transaction card. In still yet another feature, the indicium is of a different color than the surface of the card. Other stations may include, but are not limited to, magnetic strip and smart card encoding, laser engraving, color printing, graphics printing, basic topcoat and card guard UV-curing topcoat, embossing/topping, label affixing, and a combination thereof.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A method of making a transaction instrument, the method comprising:
   generating a series of virtual cross-sections based on a virtual blueprint from a digital computer model of the transaction instrument; and
   additive manufacturing or three-dimensional printing the transaction instrument, wherein the transaction instrument is comprised of a plastic and metal blend, wherein the plastic and metal blend is a metal-filled plastic, and wherein additive manufacturing or three-dimensional printing the transaction instrument includes:
   depositing successive layers of the metal-filled plastic corresponding to the series of virtual cross-sections, and
   automatically fusing the successive layers of the metal-filled plastic to form the transaction instrument, wherein automatically fusing the successive layers comprises melting or sintering the metal-filed plastic.

2. The method according to claim 1, wherein the additive manufacturing or three dimensional printing is selected from the group consisting of selective laser sintering, selective heat sintering, plaster-based three-dimensional printing, selective fusing of materials in a granular bed, selective laser melting, direct metal laser sintering, fused deposition modeling, electron-beam melting, electron-beam freeform fabrication, photopolymerization, stereolithography, laminated object manufacturing, digital light processing, and other selective fusing or photopolymerization processes.

3. The method according to claim 1, further comprising finishing the transaction instrument by subtractive manufacturing.

4. The method according to claim 1, wherein the transaction instrument further comprises ceramic, carbon, or a combination thereof.

5. The method according to claim 1, wherein the plastic is selected from the group consisting of polyvinyl chloride (PVC), polyvinyl chloride acetate (PVCA), polyester, polyethylene, polyethylene terephthalate, polycarbonate, polyethylene glycol (PET-G), acrylonitrile butadiene styrene (ABS), polypropylene, or a combination thereof.

6. The method according to claim 1, wherein some or all of the plastic is optically transparent.

7. The method according to claim 6, wherein the optically transparent plastic is opaque to some or all light outside of the visible spectrum.

8. The method according to claim 6, wherein the optically transparent plastic is opaque to ultraviolet light.

9. The method according to claim 1, wherein the transaction instrument is in a form of a card, fob, ring, watch, wrist band, bracelet, other electronic jewelry or other handheld device.

10. The method according to claim 9, wherein the card includes a machine readable indicium.

11. The method according to claim 10, wherein the transaction card comprises a recess to accommodate the machine readable indicium.

12. The method according to claim 11, wherein the recess is made by leaving a void during the three-dimensional printing or additive manufacturing process or by using subtractive manufacturing after additive manufacturing or three-dimensional printing.

13. The method according to claim 11, wherein additive manufacturing or three dimensional printing inclusive of the recess is done onto or around the machine readable indicium.

14. The method according to claim 10, wherein the machine readable indicium is printed directly onto the transaction card inclusive of the recess during three-dimensional printing.

15. The method according to claim 9, further comprising forming one or more recesses in the transaction instrument.

16. The method according to claim 15, wherein the one or more recesses comprise one or more inset devices including one or more of an integrated circuit, conducting contact pads, an EMV chip, or an antenna.

17. The method according to claim 15, wherein three-dimensional printing inclusive of the recess is done onto or around the inset device.

18. The method according to claim 1, wherein the transaction instrument comprises a hole, decorative relief, image, personalization, decorative inset, decorative color variance, transparent portion or layer, inlay, recessed area, or a combination thereof.

19. The method according to claim 1, further comprising three-dimensionally printing a personalization on the transaction instrument.

20. The method according to claim 19, wherein the personalization comprises an indicium indicative of an account associated with the transaction instrument.

21. The method according to claim 20, wherein the indicium is raised with respect to a surface of the instrument.

22. The method according to claim 19, wherein the personalization comprises a name of an individual or a company associated with the transaction instrument.

23. The method according to claim 20, wherein the indicium is of a different color than a surface of the instrument.

24. The method according to claim 19, wherein the transaction instrument is a card.

25. The method according to claim 1, wherein the transaction instrument is printed in a shape other than a transaction card.

26. A method of making a transaction instrument, the method comprising:
   generating a series of virtual cross-sections based on a virtual blueprint from a digital computer model of a three-dimensional object, and
   printing the three-dimensional object from the digital computer model, wherein the object is a financial transaction instrument, wherein the financial transaction instrument is comprised of a plastic and metal blend, wherein the plastic and metal blend is a metal-filled plastic, and wherein printing the financial transaction instrument includes:
      depositing successive layers of the metal-filled plastic corresponding to the series of virtual cross-sections,
      forming one or more recesses in the financial transaction instrument corresponding to the series of virtual cross-sections, wherein the one or more recesses are configured to hold at least one financial transaction component, and
      automatically fusing the successive layers of the metal-filled plastic to form the financial transaction instrument, wherein automatically fusing the successive layers comprises melting or sintering the metal-filed plastic.

27. A kit comprising:
   a financial transaction instrument made by:
      generating a series of virtual cross-sections based on a virtual blueprint from a digital computer model of a three-dimensional object; and
      printing the three-dimensional object from the digital computer model, wherein the object is a financial transaction instrument, wherein the financial transaction instrument is comprised of a plastic and metal blend, wherein the plastic and metal blend is a metal-filled plastic, and wherein printing the financial transaction instrument includes:
         depositing successive layers of the metal-filled plastic corresponding to the series of virtual cross-sections,
         forming one or more recesses in the financial transaction instrument corresponding to the series of virtual cross-sections, and
         automatically fusing the successive layers of the metal-filled plastic to form the financial transaction instrument, wherein automatically fusing the successive layers comprises melting or sintering the metal-filed plastic; and
   at least one financial transaction component, wherein the at least one financial transaction component comprises one or more of a machine readable indicium, an integrated circuit, an antenna, or a combination thereof, each configured for insertion into one of the one or more recesses.

* * * * *